United States Patent
Popnoe

(10) Patent No.: US 10,375,927 B2
(45) Date of Patent: Aug. 13, 2019

(54) HOOD, SHIELD, OR OTHER BLOCKING DEVICE USED IN CONJUNCTION WITH LARGE ANIMAL FEEDERS, WHICH ALLOWS INTENDED LARGE ANIMALS TO EAT FREELY, WHILE RESTRICTING SMALLER UNDESIRABLE ANIMALS ACCESS TO THE CONTENTS WITHIN THE FEEDER'S OUTLET(S)

(71) Applicant: Haden James Popnoe, Selma, TX (US)

(72) Inventor: Haden James Popnoe, Selma, TX (US)

(73) Assignee: Haden Popnoe, Selma, TX (US)

( * ) Notice: Subject to any disclaimer, the term of this patent is extended or adjusted under 35 U.S.C. 154(b) by 0 days.

(21) Appl. No.: 15/967,043

(22) Filed: Apr. 30, 2018

(65) Prior Publication Data

US 2018/0359992 A1    Dec. 20, 2018

Related U.S. Application Data

(60) Provisional application No. 62/516,095, filed on Jun. 6, 2017.

(51) Int. Cl.
*A01K 5/00*    (2006.01)
*A01K 5/02*    (2006.01)

(52) U.S. Cl.
CPC ................... *A01K 5/025* (2013.01)

(58) Field of Classification Search
CPC .... A01K 39/0113; A01K 29/00; A01K 31/12; A01K 5/0225; A01K 5/0233; A01K 5/025; A01K 39/0106; A01K 39/012; A01K 39/014
USPC ....... 119/60, 52.3, 57.9, 52.2, 52.4, 57.8, 63
See application file for complete search history.

(56) References Cited

U.S. PATENT DOCUMENTS

| | | | | |
|---|---|---|---|---|
| 5,309,867 A * | 5/1994 | Cruz | .................. | A01K 39/0113 119/52.3 |
| 6,622,654 B2 * | 9/2003 | Fasino | ................ | A01K 39/0113 119/52.3 |
| 7,347,162 B2 * | 3/2008 | Zieff | .................. | A01K 39/0113 119/52.2 |
| 7,891,317 B2 * | 2/2011 | Bodenstab | ........... | A01K 5/0225 119/51.01 |
| 8,931,435 B2 * | 1/2015 | Hepp | .................. | A01K 39/0113 119/52.4 |

* cited by examiner

*Primary Examiner* — Yvonne R Abbott-Lewis

(57) ABSTRACT

A hood, shield, plate or other blocking device, which, when attached, or build directly on, to large animal feeders allows only the intended large sized animals access to the contents within the outlets of the feeder is disclosed. By closing under the weight of the any animal when they attempt to hang, climb, or sit on the outlet of the feeder, the invention disclosed restricts the access of any animal that is too short to reach the contents in feeder's outlet(s) without the use of the feeder supporting their weight in some manner.

1 Claim, 6 Drawing Sheets

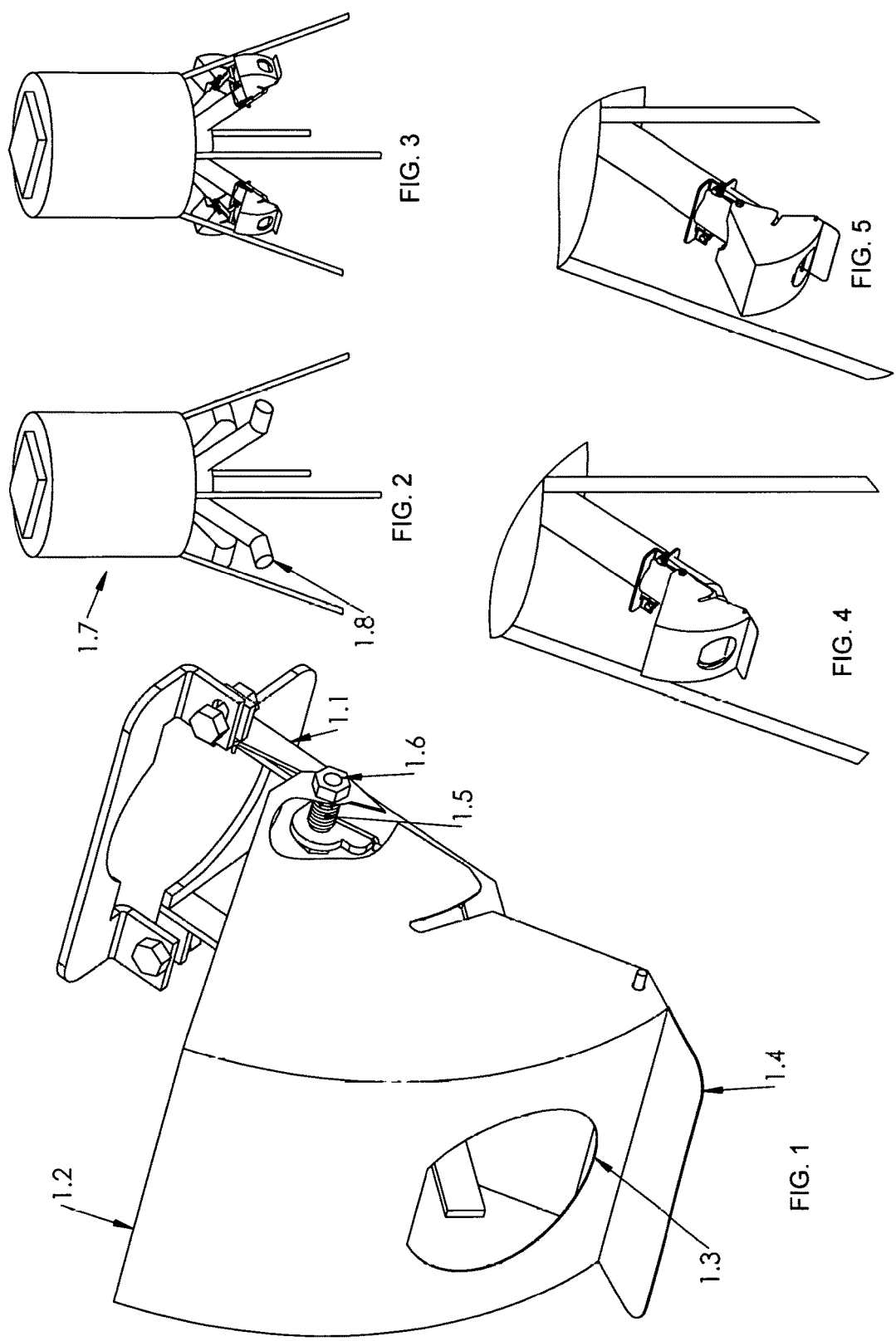

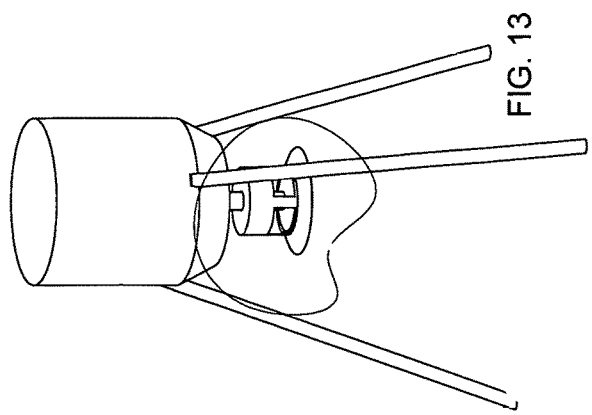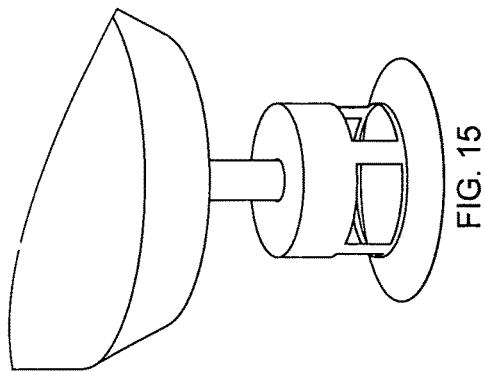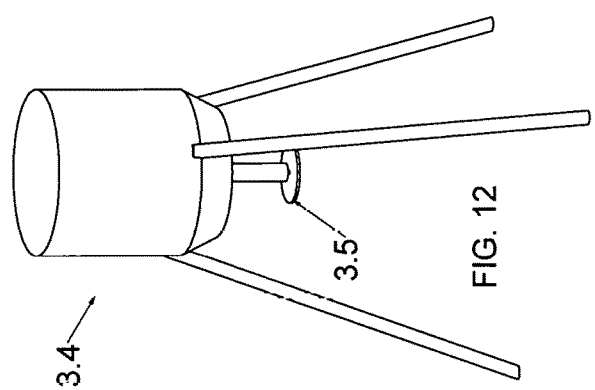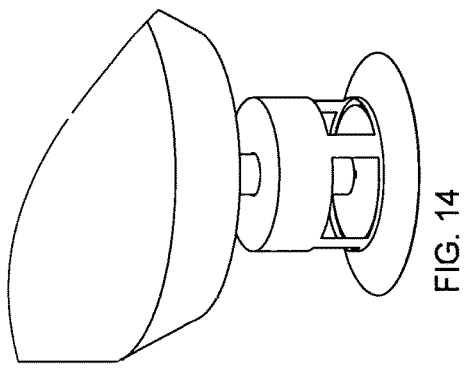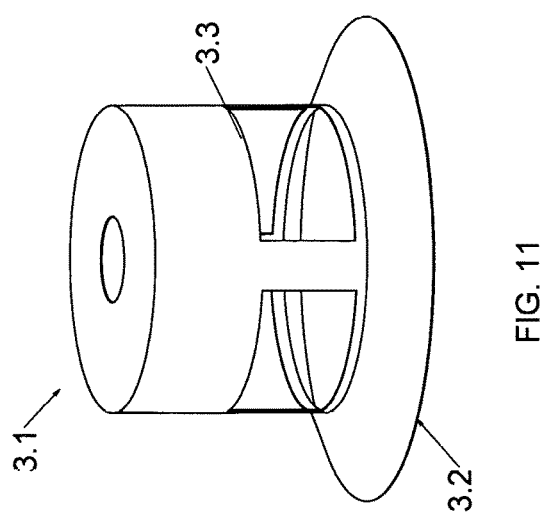

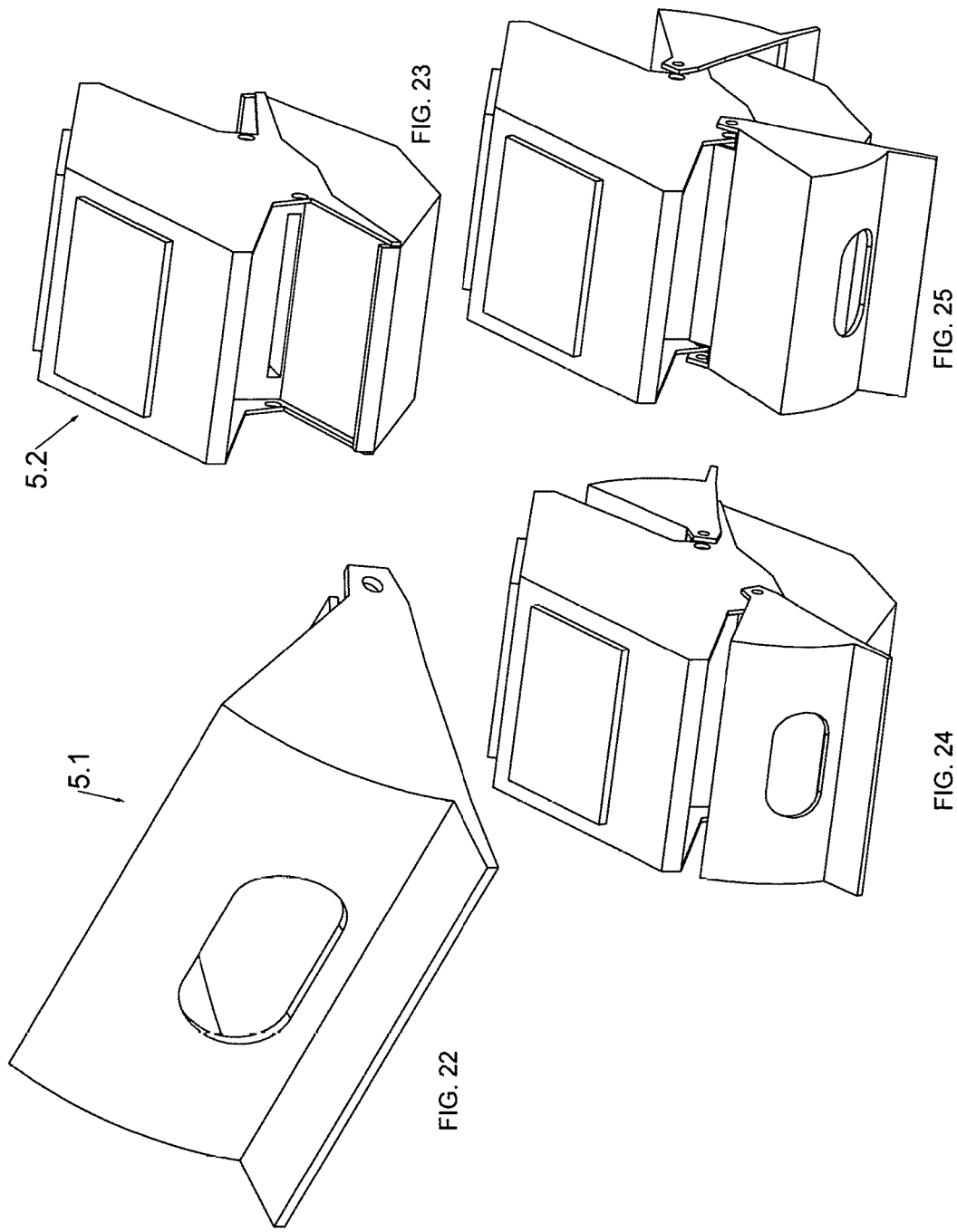

HOOD, SHIELD, OR OTHER BLOCKING DEVICE USED IN CONJUNCTION WITH LARGE ANIMAL FEEDERS, WHICH ALLOWS INTENDED LARGE ANIMALS TO EAT FREELY, WHILE RESTRICTING SMALLER UNDESIRABLE ANIMALS ACCESS TO THE CONTENTS WITHIN THE FEEDER'S OUTLET(S)

BACKGROUND OF THE INVENTION

Field of the Invention

Whether it be for food, entertainment, hunting, or breeding, many industries rely on effectively feeding different species of large animals. To accomplish this, people have developed a number of different types of feeders, each with features designed specifically to best accommodate the animals that they intend to feed as well as the type of feed that they dispense.

A "feeder", as referred to in this disclosure, is a container that holds animal feed and presents the feed to the animals in, or on, some kind of outlet, such as a trough, chute, tray or plate. For the purpose of this disclosure, a feeder does not refer to any type of container or device that drops or throws feed out with the intent that the animal eat it off the ground. A "large animal" or "tall animal" as referred to in this disclosure, is any animal that, being fed out of a feeder with outlets raised off of the ground, would eat in the normal standing position without the need to jump/climb/perch, or rely on the feeder itself to support their weight in any aspect.

One design feature, which is found on almost all feeders designed to target a specific animal, is simply the outlet(s), which dispense the feed, being designed at the proper height for the intended animal. The feed outlet being at the proper height can help the intended animal eat easily and has the added benefit of keeping (some) unintended animals from accessing the feed. The aim of the invention disclosed is to better equip this specific design feature to restrict the access of shorter unintended animals.

In many circumstances, the intended animals are not the only ones eating from the feeders and this can become a very costly issue. Raccoons as well as many other animals, which can climb or jump, can often still access the outlets of feeder even though they cannot reach simply by standing.

The unintended animal will most often climb the feeder in one of two ways. They will either climb the legs, or sides, of the feeder and make their way to the feed outlets, or, will reach up and grab the bottom of the outlets directly and pull themselves up. No matter which way they manage to ascend, the unintended animal will strive to obtain a position on top of, or inside, the outlet in order that they may eat their fill with minimal effort.

There is a need for an invention that, when used on feeders with outlets designed for tall animals, will allow animals of the proper height to eat freely while restricting access to smaller animals regardless of their ability to climb/jump or hang onto the feeder outlet.

Prior Art

1. US PAT NO. 2012/0037079 A1 Dated Feb. 16, 2012. Rasmussen. Rasmussen discloses a drop away tray positioned under the outlets of the feeder, which pivots under the weight of unintended animals. The goal of the drop away tray is to remove the unintended animal from the feeding area by causing them to fall to the ground before they can access the feed.

2. U.S. Pat. No. 5,048,461 Dated Sep. 17, 1991. Wessner. Wessner discloses a bird feeder with a perch that is coupled to a counter weight system which, depending on the bird's weight, will allow or restrict access to the bird feed within the feeder.

BRIEF SUMMARY OF THE INVENTION

The following disclosure summarizes the invention along with some of the different possible embodiments in order to provide a basic understanding of how invention works and how it may be applied in order to solve the problem as outlined previously.

This summary is not an all-inclusive list of possible embodiments nor is it meant to identify necessary components of the invention. In short, this summary intended to limit the claim of the invention.

The goal of the invention is to protect the outlet end of large animal feeders from unwanted animals while still allowing the larger intended animals to eat freely. The working concept of the invention is a shield, hood, or other blocking device that is either attached to, or, built directly on the feeder, which, when either climbed onto or pulled down by an animal, moves under the animal's weight in order to close the opening of the outlet. When the unwanted animal is not on top of, or pulling down on, the device the device remains in the neutral open position where an opening in the device, or created by the device, is aligned with the opening of the feeder outlet(s). In this neutral position, only animals that can eat from the feeder without sitting, hanging or climbing on the feeder can eat without restriction. In short, the device restricts access to all animals not tall enough to reach the feed without the aid of the feeder or device supporting their weight in any aspect.

BRIEF DESCRIPTION OF THE SEVERAL VIEWS OF THE DRAWINGS

SHEET 1 (FIG. 1) is a basic embodiment of the invention, as it may be designed for a single chute or tube-style outlet of a common type of wildlife feeder (FIG. 2). The embodiment of the invention shown, is installed on the outlets of the feeder (FIG. 3) and operates by rotating around rods positioned toward the back of the blocking device to misalign the opening in the blocking device and that of the outlet, making the contents inaccessible. In the neutral position (FIG. 4), the opening of the device and the opening of the feeder outlet are aligned and the feed is made accessible. This particular embodiment is held in the neutral position by torsion springs acting at the rods around which the device rotates to the closed position (FIG. 5) when engaged by an unintended animal.

SHEET 2 (FIG. 6) is an embodiment of the invention, as it may be designed for a multi-chute or connected outlet type of wildlife feeder (FIG. 7). The embodiment of the invention shown, is installed on the outlets of the feeder (FIG. 8) and each blocking device operates independently by rotating around rods positioned toward the back of each blocking device to misalign the opening in the blocking device and that of the outlet, making the contents inaccessible. In the neutral position (FIG. 9), the opening of the device and the opening of the feeder outlet are aligned and the feed is made accessible. This particular embodiment is also held in the neutral position by torsion springs acting at the rods around which the device rotates to the closed position (FIG. 10) when engaged by an unintended animal.

SHEET 3 (FIG. 11) is a depiction of how the invention can be designed in order to protect a feeder that uses a tray or plate as a feed outlet (FIG. 12). The blocking device is installed over the feed outlet plate (FIG. 13) and, in this example, is held in the neutral position (FIG. 14) with a compression spring and moves downward linearly in order to close access to the feed on the outlet (FIG. 15).

Figure 21:
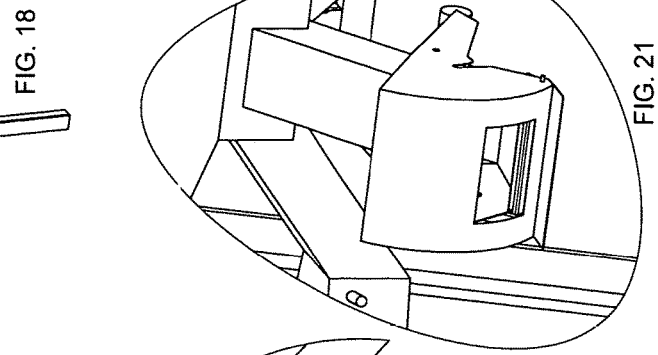
Figure 18:
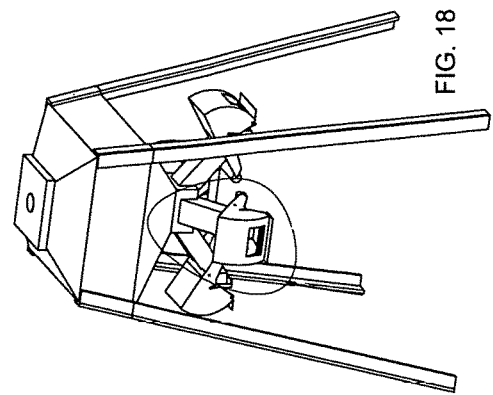
Figure 20:
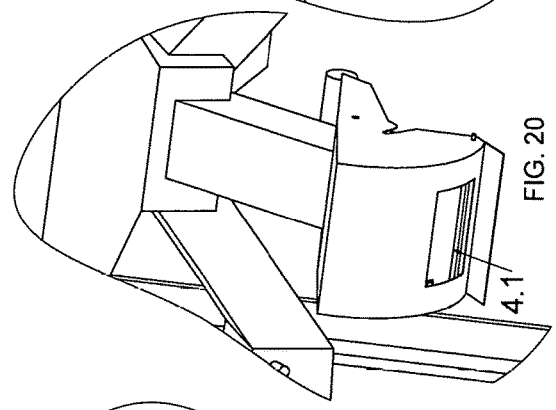
Figure 16:
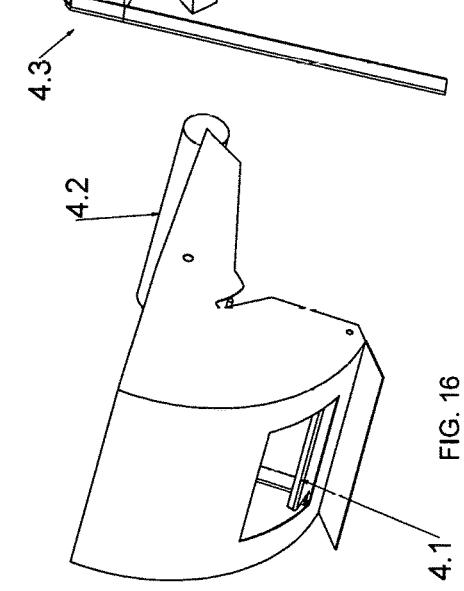

SHEET 4 (FIG. 16) is a possible design for a tube or chute style feeder (FIG. 17) and is a slightly more complicated version of the invention with different features including a counter weight stored energy device and two separate shields working from the top down and bottom up to close the opening. The inner and outter blocking devices are installed on the feeder outlets (FIG. 18). A counter weight is shown in this example as the stored energy that holds the blocking devises in the neutral position (FIG. 20). The downward force of an unwanted animal's weight drives both components to rotate around there individual pivot points (FIG. 19) in order to close the access to the contents within the chute (FIG. 21).

SHEET 5 (FIG. 22) shows how the invention can be designed to be applied to other types of feeders, in this particular case a livestock feeder (FIG. 23). In the same manner as the previous examples, the devise is held in the open position (FIG. 24) with the aid of a stored energy devise and can move to the closed position (FIG. 25) under the weight of an unwanted animal.

Figure 28:
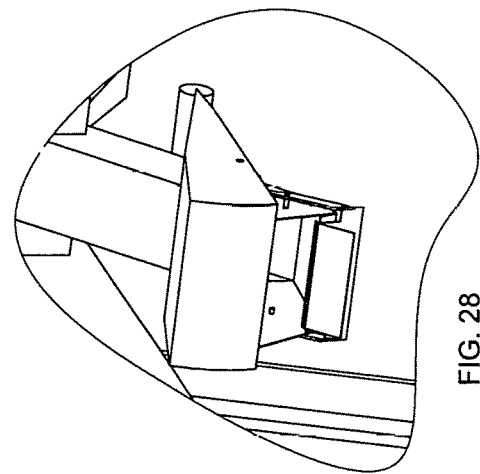
Figure 27:
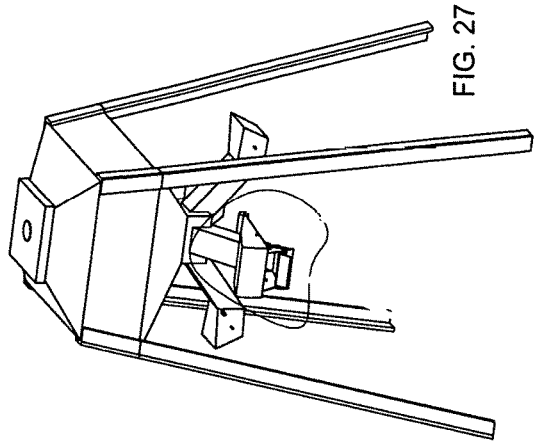

SHEET 6 (FIG. 26) is an example of how an embodiment may be designed to create an opening between two or more blocking devices. Both devices are attached to or built onto the outlet of the feeder (FIG. 27) with the opening created between the two devices (FIG. 28) allowing for access to the feed and the opening being eliminated (FIG. 29) with the onset of the unwanted animals weight.

DETAILED DESCRIPTION OF THE INVENTION

The invention is a hood, shield, or any type of blocking device (or devices) that when utilized on a feeder (specifically intended for large animals), will allow access to the intended large animal but will deny the access of the feed within the feeder to smaller unwanted animals.

The invention can be designed to attach onto the outlets of existing feeders, or, can be fabricated directly onto the feeder. The invention works by only allowing access to the contents within the feeder to animals that are tall enough to reach the feed within, or on, the outlet without the need to sit, climb or hang on the outlet of the feeder.

The device is designed such that the outlet of the feeder, which smaller animals would use to support their weight, is guarded and an attempt to grab, climb, or sit on the outlet would result in engaging the device. The device includes, or creates, an opening that is held in the neutral/open position by a stored energy component including, but not limited to: a spring, counterweight, battery, or combination of multiple components. In the neutral position, the feed within the feeder outlet is accessible to any animal that can reach it without relying on the feeder outlet or device to support their weight. When an animal, that is too short, tries to access the feed by climbing onto or hanging from the device, the weight of the animal will cause the device to close the outlet of the feeder and restricts access to the animal.

The invention can have multiple embodiments and apply to many large animal feeders, so long as the feeder is designed such that the height of the dispensing outlet is high enough that unintended animals cannot access feed by simply standing on the ground in the same position and in the same manner that the intended animal would.

Depending on the embodiment and design of the invention, the weight of the animal can either cause the blocking component(s) of the device to rotate downward or move linearly downward. The invention can also be designed such that the downward force of the animal's weight causes a blocking component(s) to rise or rotate upwards, sideways, around a central axis, or any combination of these manners in order to block the opening.

Fabrication of the device can be with a number of different kinds of material such as sheet metal, plastic, wood or any other solid construction material. The invention can also be designed to work with fabric that wraps in front of the outlet in order to close the opening.

The necessary components of the invention are (1) a blocking device(s) which in the neutral position, either contains an opening, or creates an opening, such that the opening allows the feed within the feeder to be made accessible. With the onset of the weight of an unwanted animal, the blocking device(s) moves in some manner in order to deny access to the feed. (2) A stored energy device, including but not limited to: a spring, counterweight, elastic band or a combination of different stored energy devices that holds the blocking devise in the neutral open position, with a force which can be overcome by the weight of an unwanted animal acting on the invention, in order to close the opening of the feeder.

DETAILED DESCRIPTION OF DRAWINGS AND FIGURES

SHEET 1 depicts the invention in one possible embodiment designed to attach to the outlet end of an existing tube-style wildlife feeder. The blocking device (1.2—FIG. 1) is attached to a mounting apparatus (1.1—FIG. 1) at the pivot rod (1.6—FIG. 1). The mounting apparatus fits onto the outlet of the feeder and secures the invention in place. The pivot rod (1.6) enables the blocking device (1.2) to rotate downward under the weight of an unwanted animal in order to close the opening of the outlet (1.8—FIG. 2) thus preventing access to the feed within the feeder (1.7—FIG. 2). The device (1.2) has an opening (1.3—FIG. 1) which, in the neutral position, is aligned with the opening of the feeder outlet (1.8). The device (1.2) is held in the neutral position, in this particular example, by the force of a torsion spring (1.5—FIG. 1) acting at the pivot point. The device (1.2) with the aid of the optional lip (1.4—FIG. 1) guards the end of the outlet from being grabbed by and unwanted animal. The device is designed such that any attempt from an unwanted animal to grab or sit/climb on the outlet would result in the hood being moved to the active blocking configuration. FIG. 2 is a representative (unprotected) chute-style wildlife feeder with feed outlets (1.8). FIG. 3 shows the same style of feeder with this example of the invention installed on all outlets. FIG. 4 depicts the invention installed and held in the neutral open position. FIG. 5 depicts the invention installed in the active blocking, or closed, state which would be the case if an unwanted animal was sitting/climbing on or hanging from the device (1.2).

Figure 7:
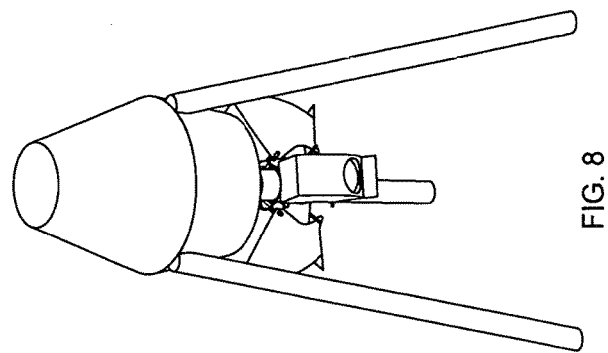
Figure 9:
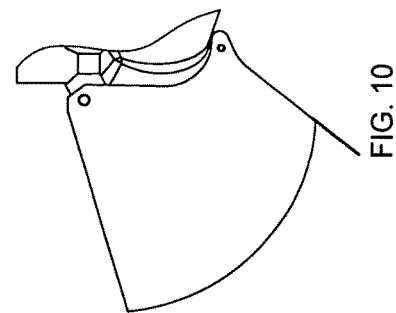
Figure 8:
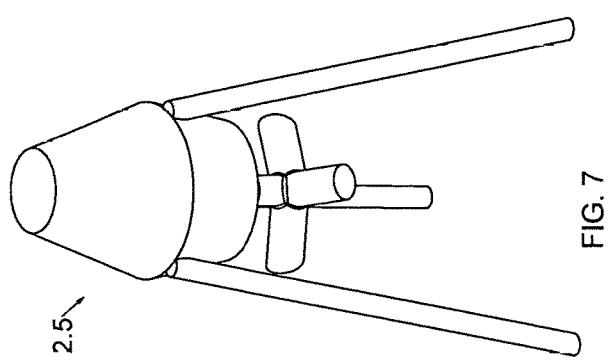
Figure 10:
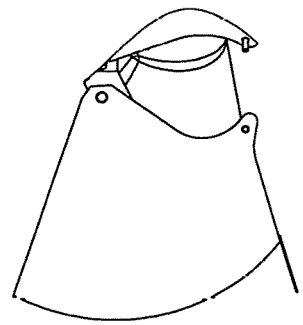
Figure 6:
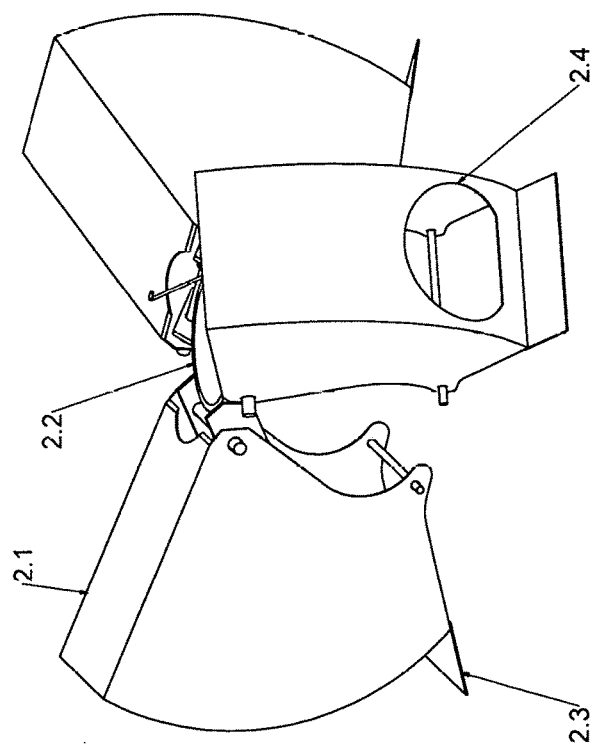

SHEET 2 depicts a different embodiment of the invention designed for a slightly different style of wildlife feeder (2.5—FIG. 7). The blocking device(s) (2.1—FIG. 6), in this example, are all connected to a single mounting apparatus (2.2—FIG. 6). Since the assembly would install after the fabrication of the feeder, this is an example of what would be an "attachable" embodiment of the invention, similar to the example in SHEET 1. In the neutral position (FIG. 8 & FIG. 9), at least one or a combination of multiple different energy storage elements holds each blocking device open. In this neutral position the opening of the feeder outlet (2.5) and the invention (2.4—FIG. 6) are aligned and the feed is accessible. In the closed position (FIG. 10), the device has been rotated downward under the weight of an unwanted animal either sitting on top of the blocking device (2.1) or hanging from the optional bottom lip (2.3—FIG. 6) of the device.

SHEET 3 depicts an example of the invention as it might be designed to work on a different type of feed outlet. The blocking device (3.1—FIG. 11) is designed with an opening (3.3—FIG. 11) and an optional lip/guard (3.2—FIG. 11). The invention as it pertains to this example could be used on a feeder such as the one shown (3.4—FIG. 12) which presents the feed to the animals on a suspended plate or tray (3.5—FIG. 12). The blocking device (3.1) in this example could be held in the open position (FIG. 13 & FIG. 14) by the force from a compression spring below or above the blocking device. With the onset of the additional weight from the unwanted animal climbing, sitting, or hanging on the invention, the invention would move linearly downward to the closed position (FIG. 15) to block access to the feed on the plate or in the tray.

Figure 17:
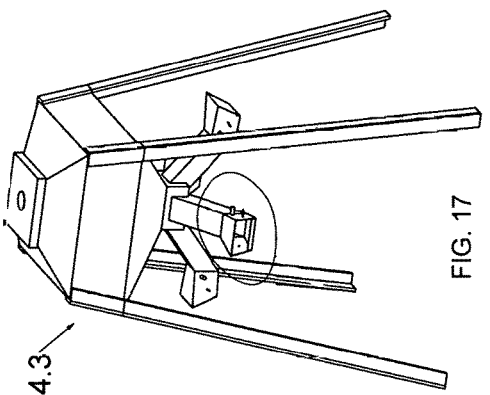
Figure 19:
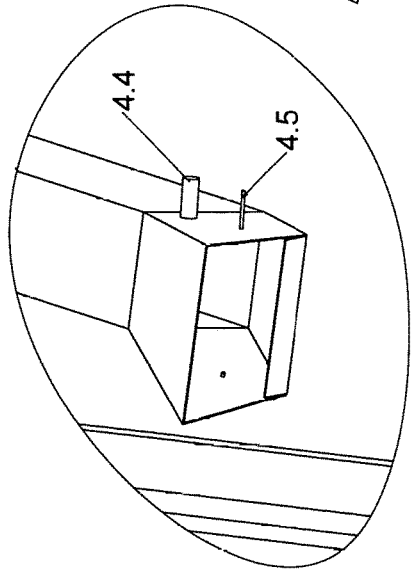

SHEET 4 is included to show some different possible design features of the invention. Here is a possible version of the invention which, includes a counterweight (4.2—FIG. 16) that can be used in lieu of, or in addition to, other stored energy devices such as springs. In addition to the blocking device sitting on top of the outlet (as detailed in the previous drawings), this example depicts an additional blocking device (4.1—FIG. 16) below the opening of the outlet. The bottom blocking device can be designed to rotate upwards on its own pivot point (4.5—FIG. 19) under the weight of the unwanted animal to block the opening of the feed outlet. This blocking device can be used in lieu of or in addition to the top blocking device shown here and in the previous drawings. Notice, this is an example without a mounting apparatus. The pivot rods (4.4—FIG. 19) are connected directly to the feeder (FIG. 17 & FIG. 19). The example of the invention depicted would be one possibility of how the invention could be "built on" to the feeder, therefore the invention is not limited to attachable designs only. FIG. 18 & FIG. 20 show this version of the invention in the neutral open position and shown in FIG. 21 is the invention in the closed position. As a result of the weight of the unwanted animal, the bottom blocking device (4.1—FIG. 20) has been rotated upward to block the bottom portion of the opening, while the top blocking device rotates at least enough to close the top portion of the opening. Of course, a bottom device could be designed to block the entire opening without the need of the top device. This is just an example to not only show how a blocking device can be designed to rotate upward as a result of a downward force from an unwanted animal but also to show how more than one blocking device can be used together in order to close the opening and restrict access.

SHEET 5 depicts an example of the invention on a completely different type of feeder. This type of feeder (5.2—FIG. 23) would be an example of a design geared toward livestock, such as cattle. The blocking device (5.1—FIG. 22) could again attach to or be built directly on the feeder in order to protect the outlets. FIG. 23 & FIG. 24 show the invention in the open position whereas FIG. 25 shows the invention in the closed state, again blocking access to the feed on or in the outlet. This example is provided for the specific purpose of showing that the invention is not limited to the types of feeder in the previous drawings, but can be designed to work on a wide range of different large animal feeders.

Figure 29:
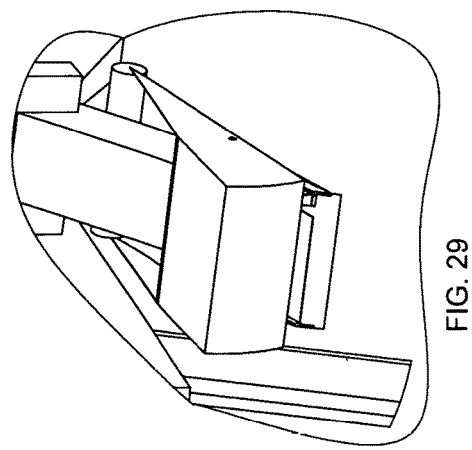
Figure 26:
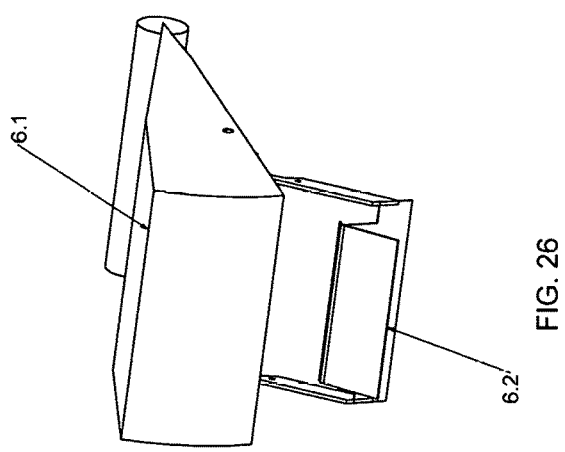

SHEET 6 is one example embodiment of the invention which, instead of including an opening cut out of the blocking device, creates an opening between two or more blocking devices (6.1 & 6.2—FIG. 26). The device is shown in the open state (FIGS. 26 & 27) and in the closed state (FIG. 29).

The drawings provided are not an all-inclusive list of possible designs of the invention, they are only examples to show the large range of possible embodiments of the invention. Together, the drawings show how the invention can utilize different designs of blocking devices (or multiple devices), which can be held in the neutral position with a variety of different stored energy devices (or multiple devices) to make the contents within the outlet of a feeder accessible by either aligning an opening, or creating an opening.

The examples show that the blocking device(s) of the invention, can be designed to move in different manners (or multiple different manners) in order to restrict access to feed within, or on, feeder outlets under the weight of an unwanted animal. Lastly, the example drawings show how all the different configurations of the invention can be designed to work on multiple types of large animal feeders.

Contrast to Prior Art

Unlike the invention disclosed by Rasmussen, my invention actively blocks the outlet of the feeder when engaged by an unwanted animal instead of just moving under their weight in order to make them fall. In the case that the animal is sitting on top of the outlet of the feeder, Rasmussen's invention can do nothing to prevent access to the contents within. On the other hand, my invention, in the same situation, would be in the closed state and the animal would have their access denied. If the unwanted animal simply reached from the bottom to move Rasmussen's tray out of the way, they would then be able to grab the outlet freely. With my invention, if the animal tries to pull down to move the device out of the way the device will close and eliminate the animal's access to the contents within the outlet(s).

Unlike Wessner's bird feeder, or any similar bird feeder applications, my invention does not sift the animals by their weight allowing the lighter animal to eat while restricting the heavier animal or vice versa. My invention restricts any animal that requires the feeder to support their weight in any aspect, amplifying a height variance not a weight variance to allow or restrict access to the contents within feeder. The weight of unwanted animals does drive the working concept of my invention, but only on a binary basis. Either the animal needs to use the feeder to support their weight, or they do not. Bird feeders, such as the one in Wessner's disclosure, assume intended and unintended animals must both use the feeder to support their weight, any blocking device or concept that would allow/restrict access would be based on a weight variance.

The invention claimed is:

1. A hood, shield, plate, or other type of blocking device(s), whether built on, attached to, or set up in the proximity of, an animal feeder, which,
   a. being held in a neutral position, by a stored energy device(s), will align an opening or create an opening such that contents within, or on, the outlet of an animal feeder remain accessible, and b. is not weight discriminating, but rather, in order to block access to the contents within, or on, the feeder outlet, will move in any manner under the weight of any animal, which requires the feeder to support its weight in any aspect in order to easily access the feed within, or on, the feeder outlet.

* * * * *